US008321453B2

(12) United States Patent
Matsushita

(10) Patent No.: US 8,321,453 B2
(45) Date of Patent: Nov. 27, 2012

(54) COMMUNICATION SYSTEM

(75) Inventor: Satoshi Matsushita, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 491 days.

(21) Appl. No.: 12/560,734

(22) Filed: Sep. 16, 2009

(65) Prior Publication Data
US 2010/0079796 A1 Apr. 1, 2010

(30) Foreign Application Priority Data

Sep. 29, 2008 (JP) ................................. 2008-250373

(51) Int. Cl.
*G06F 7/00* (2006.01)
*G06F 17/30* (2006.01)
(52) U.S. Cl. ...................................... 707/770; 707/795
(58) Field of Classification Search .......... 707/600–831; 711/103, 114, 170, 203, 172, 224; 714/48, 714/49, 52–54, 703–704; 725/97
See application file for complete search history.

(56) References Cited

U.S. PATENT DOCUMENTS

| 7,769,837 B2 * | 8/2010 | Nogawa et al. ................ 709/222 |
| 7,912,806 B2 * | 3/2011 | Yanagi et al. ................... 706/50 |
| 8,019,810 B2 | 9/2011 | Read | |
| 2004/0103190 A1 | 5/2004 | Mochizuki et al. | |

(Continued)

FOREIGN PATENT DOCUMENTS

JP 2002-297342 10/2002

(Continued)

OTHER PUBLICATIONS

Gilbert C. Sih et al., Dynamic-level scheduling for heterogeneous processor networks, 1990, IEEE, 42-49.*

(Continued)

*Primary Examiner* — Jean B Fleurantin
(74) *Attorney, Agent, or Firm* — Scully, Scott, Murphy & Presser, P.C.

(57) ABSTRACT

A communication system includes: a communication device; and a data receiver that is configured so as to be capable of being connected to the communication device. The communication device includes: a content summary receiving unit that is configured so as to be capable of receiving content summary data transmitted from an external device, the content summary data including at least positional data and title data for content data; and a positional data transmitting unit. The data receiver includes a scheduled port querying unit that is configured to transmit to the communication device a query querying the communication device for a scheduled port. The communication device further includes: a scheduled port notifying unit that, upon receiving the scheduled port query from the data receiver, transmits to the data receiver a scheduled port notification indicating the scheduled port. The data receiver further includes: a determining unit that determines whether the scheduled port indicated in the scheduled port notification is available; and an availability notifying unit that transmits to the communication device an availability notification indicating the scheduled port that is determined as being available. The communication device further includes: an active port setting unit that sets the scheduled port indicated by the availability notification as an active port; and an active port notifying unit that transmits to the data receiver an active port notification indicating the active port. The positional data transmitting unit transmits the positional data for the content data to the data receiver through the active port at a prescribed timing and according to the prescribed communication protocol.

18 Claims, 9 Drawing Sheets

U.S. PATENT DOCUMENTS

| | | |
|---|---|---|
| 2005/0148326 A1* | 7/2005 | Nogawa et al. ............... 455/420 |
| 2007/0174298 A1 | 7/2007 | Tanimoto |
| 2007/0214477 A1 | 9/2007 | Read |
| 2007/0255734 A1 | 11/2007 | Morimoto |
| 2008/0165209 A1 | 7/2008 | Kondo et al. |
| 2009/0076904 A1 | 3/2009 | Serena |
| 2009/0182847 A1 | 7/2009 | Suzuki |
| 2009/0187638 A1 | 7/2009 | Park et al. |
| 2009/0298480 A1 | 12/2009 | Khambete et al. |

FOREIGN PATENT DOCUMENTS

| | | |
|---|---|---|
| JP | 2003-152942 | 5/2003 |
| JP | 2004-005413 A | 1/2004 |
| JP | 2007-157096 A | 6/2007 |
| JP | 2007-200209 | 8/2007 |
| JP | 2007-219644 A | 8/2007 |
| JP | 2007-280248 A | 10/2007 |
| JP | 2008-078823 | 4/2008 |
| JP | 2008-165692 | 7/2008 |

OTHER PUBLICATIONS

Japanese Offical Action date Jun. 29, 2010 with English translation.

Official Action dated Feb. 17, 2012 in a related application, namely, U.S. Appl. No. 12/726,535.

Official Action dated Sep. 17, 2012 in a related application U.S. Appl. No. 12/726,535.

Japanese Official Action dated Sep. 4, 2012 from related application JP 2011-063690.

* cited by examiner

FIG.6(a)
(PROCESSES AT MULTIFUNCTION PERIPHERAL)

```
FEED ANALYSIS PROCESS
         │
         ▼
  ACQUIRE RSS FEEDS ──S11
         │
         └──────────┐
                    (loop)
```

FIG.6(b)
(PROCESSES AT MULTIFUNCTION PERIPHERAL)

```
MULTIFUNCTION PERIPHERAL
     DISPLAY PROCESS
            │
            ▼
DISPLAY CONTENT TITLES
IN ORDER OF EACH ITEM OF ──S31
CONTENT AS A TICKER
            │
            ▼
DISPLAY LIST OF CONTENTS
OF RSS SITE CORRESPONDING
TO DISPLAYED CONTENT     ──S32
TITLE TOUCHED BY A USER
            │
            ▼
DISPLAY CONTENT SUMMARY
CHARACTER STRING AND     ──S33
THE LIKE FOR CONTENT ITEM
SELECTED BY USER
            │
            ▼
DISPLAY LIST OF PCS IN
RESPONSE TO USER'S       ──S34
OPERATION OF VIEW BUTTON
            │
            ▼
TRANSMIT URL OF USER'S
SELECTED CONTENT ITEM    ──S35
TO USER'S SELECTED PC
            │
            └──(loop)
```

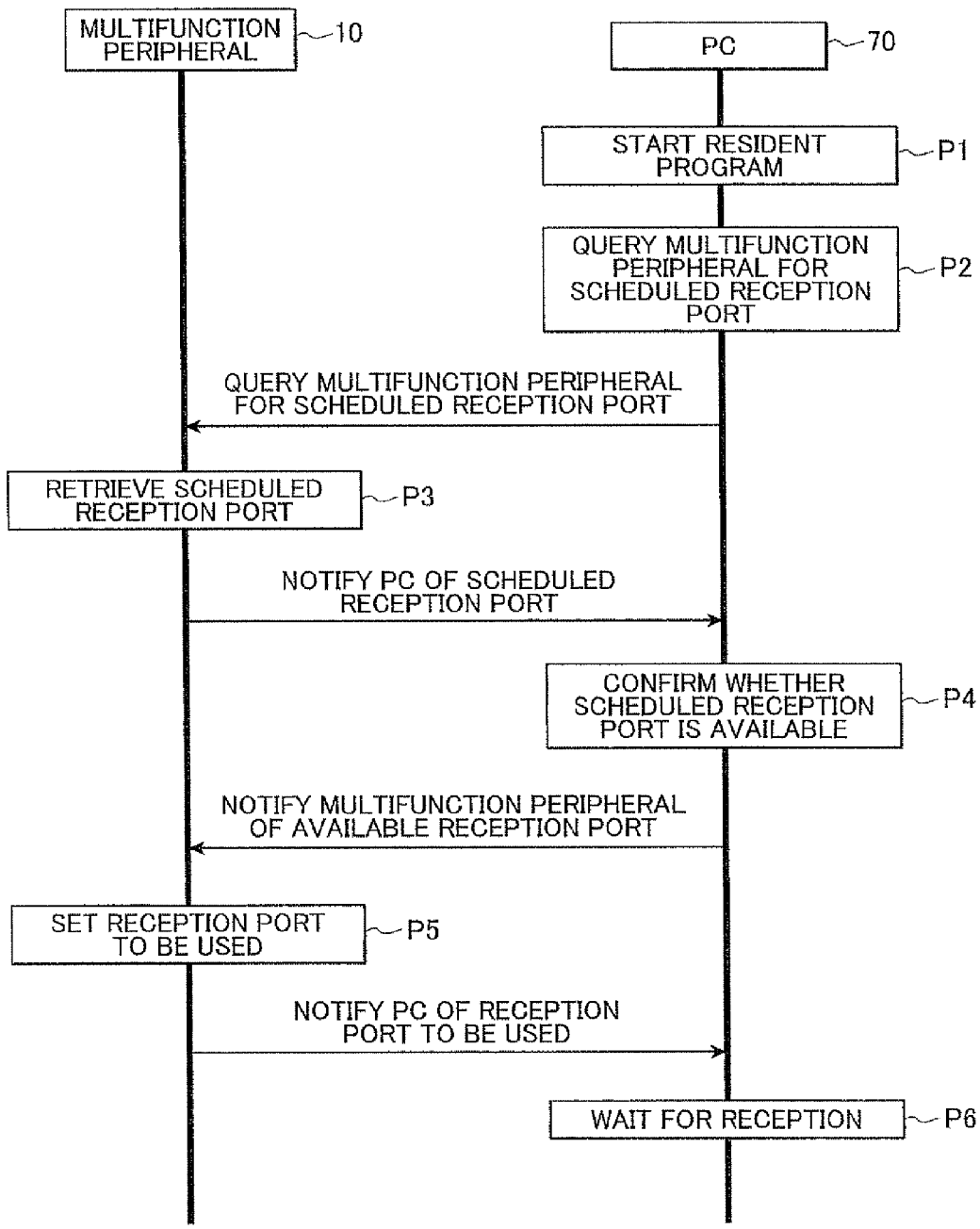

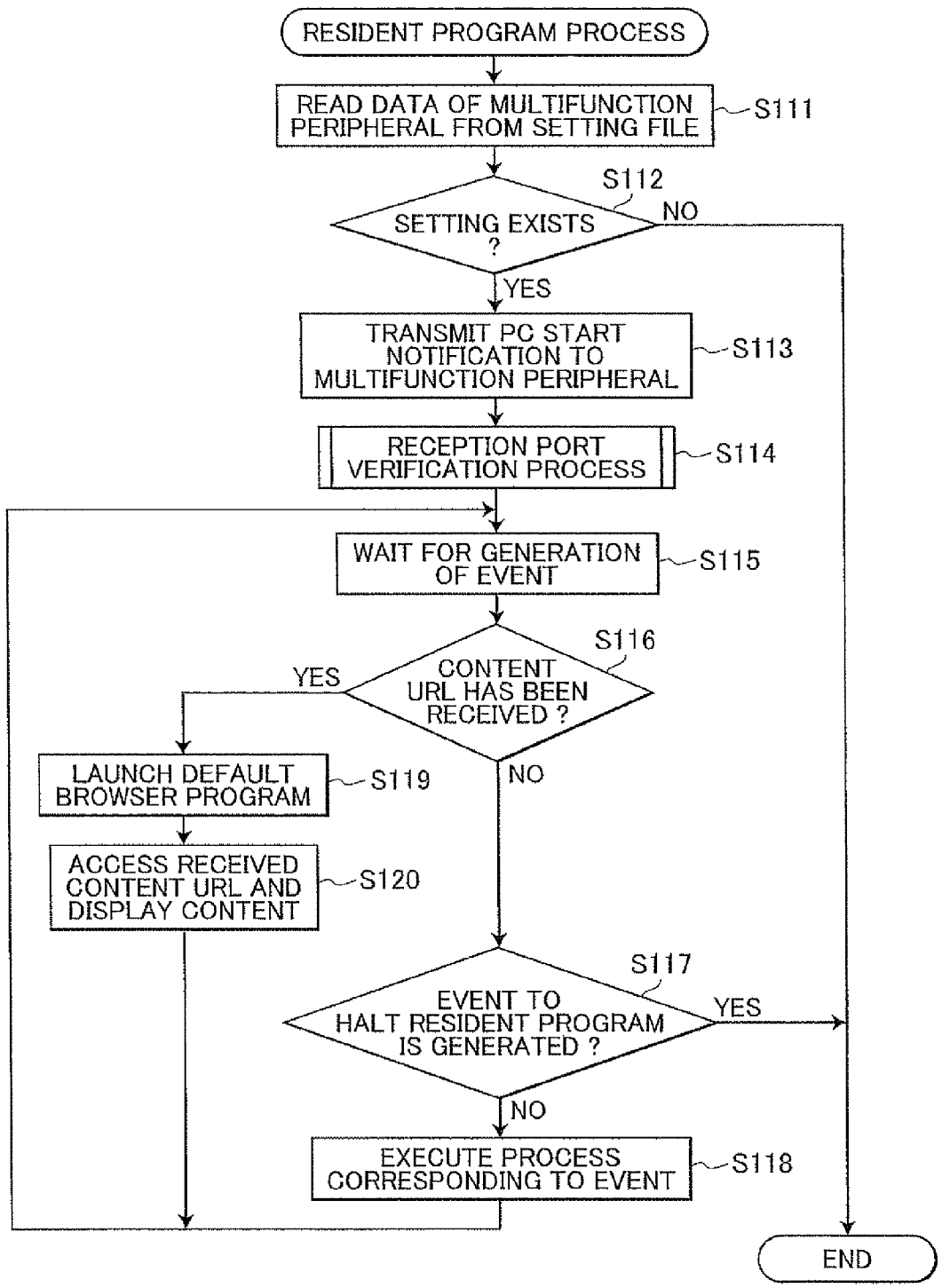

COMMUNICATION SYSTEM

CROSS REFERENCE TO RELATED APPLICATION

This application claims priority from Japanese Patent Application No. 2008-250373 filed Sep. 29, 2008. The entire content of the priority application is incorporated herein by reference.

TECHNICAL FIELD

The present invention relates to a communication system.

BACKGROUND

Servers that distribute a summary of content published on a network (a Web site, for example) are well known in the art. The content summary includes the title and Uniform Resource Locator (URL) of the content. One example of the content summary is referred to as a "feed." A server known in the art for distributing feeds in the Resource Description Framework Site Summary (RSS) format is called an RSS server.

An RSS reader that acquires feeds in the RSS format (RSS feeds) from a plurality of RSS servers is known in the art. This conventional RSS reader displays for the user on a display device the titles of RSS feeds acquired from the RSS servers, and buttons that link to content corresponding to each of the titles. The user can display desired content by selecting the corresponding link.

SUMMARY

Since RSS feeds or other content summaries include a small enough amount of data that can be displayed in a relatively small area, a summary can be viewed without problem on a display device having a relatively small screen. However, the content itself may include a large amount of text, as well as image data. When such content is displayed on a relatively small display device, the user must frequently perform scrolling operations to scroll the screen in order to view all of the content. This is not only inconvenient, but makes it difficult for the user to enjoy viewing the content.

In view of the foregoing, it is an object of the present invention to provide a communication system ensuring that a user can view his/her desired content easily.

In order to attain the above and other objects, the invention provides a communication system including: a communication device; and a data receiver that is configured so as to be capable of being connected to the communication device.

The communication device includes: a content summary receiving unit; and a positional data transmitting unit. The content summary receiving unit is configured so as to be capable of receiving content summary data transmitted from an external device, the content summary data including at least positional data and title data for content data. The positional data transmitting unit is configured so as to be capable of outputting the positional data for the content data according to a prescribed communication protocol.

The data receiver includes a scheduled port querying unit that is configured to transmit to the communication device a query querying the communication device for a scheduled port, which conforms to the communication protocol and through which the communication device is scheduled to output the positional data for the content data to the data receiver.

The communication device further includes: a scheduled port notifying unit that, upon receiving the scheduled port query from the data receiver, transmits to the data receiver a scheduled port notification indicating the scheduled port.

The data receiver further includes: a determining unit; and an availability notifying unit. Upon receiving the scheduled port notification from the communication device, the determining unit determines whether the scheduled port indicated in the scheduled port notification is available. When the determining unit has determined that the scheduled port is available, the availability notifying unit transmits to the communication device an availability notification indicating the scheduled port that is determined as being available.

The communication device further includes: an active port setting unit; and an active port notifying unit. Upon receiving the availability notification from the data receiver, the active port setting unit sets the scheduled port indicated by the availability notification as an active port. The active port notifying unit transmits to the data receiver an active port notification indicating the active port, the positional data transmitting unit transmitting the positional data for the content data to the data receiver through the active port at a prescribed timing and according to the prescribed communication protocol.

The data receiver further includes: an active port receiving unit; and a positional data receiving unit. The active port receiving unit receives the active port notification from the communication device. The positional data receiving unit is configured so as to be capable of receiving, via the active port indicated in the active port notification, the positional data for the content data outputted from the communication device.

According to another aspect, the present invention provides a communication device that is configured so as to be capable of being connected to a data receiver. The communication device includes: a content summary receiving unit; a positional data transmitting unit; a scheduled port notifying unit; an active port setting unit; and an active port notifying unit. The content summary receiving unit is configured so as to be capable of receiving content summary data transmitted from an external device, the content summary data including at least positional data and title data for content data. The positional data transmitting unit is configured so as to be capable of outputting the positional data for the content data according to a prescribed communication protocol. The scheduled port notifying unit is configured to receive, from the data receiver, a scheduled port query querying the communication device for a scheduled port, which conforms to the communication protocol and through which the communication device is scheduled to output the positional data for the content data to the data receiver, the scheduled port notifying unit being further configured to transmit, upon receipt of the scheduled port query, to the data receiver a scheduled port notification indicating the scheduled port. The active port setting unit is configured to receive, from the data receiver, an availability notification indicating the scheduled port that is confirmed as being available by the data receiver, and to set the scheduled port indicated by the availability notification as an active port, the positional data transmitting unit transmitting the positional data for the content data to the data receiver through the active port at a prescribed timing and according to the prescribed communication protocol. The active port notifying unit transmits to the data receiver an active port notification indicating the active port.

According to another aspect, the present invention provides a method for receiving positional data for content data from a communication device, the communication device including: a content summary receiving unit that is configured so as to be capable of receiving content summary data transmitted from an external device, the content summary data including the positional data for the content data and title data for the content data; and a positional data transmitting unit that is configured so as to be capable of outputting the positional data for the content data according to a prescribed communication protocol. The method includes:

transmitting, to the communication device, a query querying the communication device for a scheduled port, which conforms to the communication protocol and through which the communication device is scheduled to output the positional data for the content data to the data receiver, thereby urging the communication device to output a scheduled port notification indicating the scheduled port;

upon receipt of the scheduled port notification, determining whether the scheduled port indicated in the scheduled port notification is available;

when it is determined that the scheduled port is available, transmitting to the communication device an availability notification indicating the scheduled port that is determined as being available, thereby urging the communication device to set, as an active port, the scheduled port determined as being available;

receiving an active port notification when the active port notification is transmitted from the communication device; and receiving the positional data for the content data through the active port indicated in the active port notification when the positional data for the content data is transmitted from the positional data transmitting unit of the communication device and according to the prescribed communication protocol.

According to another aspect, the present invention provides a computer readable medium storing a set of program instructions for controlling a data processing device to serve as a data receiver for receiving positional data for content data from a communication device, the communication device including: a content summary receiving unit that is configured so as to be capable of receiving content summary data transmitted from an external device, the content summary data including the positional data for the content data and title data for the content data; and a positional data transmitting unit that is configured so as to be capable of outputting the positional data for the content data according to a prescribed communication protocol. The instructions include:

transmitting, to the communication device, a query querying the communication device for a scheduled port, which conforms to the communication protocol and through which the communication device is scheduled to output the positional data for the content data to the data receiver, thereby urging the communication device to output a scheduled port notification indicating the scheduled port;

upon receipt of the scheduled port notification, determining whether the scheduled port indicated in the scheduled port notification is available;

when it is determined that the scheduled port is available, transmitting to the communication device an availability notification indicating the scheduled, port that is determined as being available, thereby urging the communication device to set, as an active port, the scheduled port determined as being available;

receiving an active port notification when the active port notification is transmitted from the communication device; and receiving the positional data for the content data through the active port indicated in the active port notification when the positional data for the content data is transmitted from the positional data transmitting unit of the communication device and according to the prescribed communication protocol.

BRIEF DESCRIPTION OF THE DRAWINGS

FIGS. 5(a)-5(d) include explanatory diagrams showing sample content displayed on a display panel of the multifunction peripheral, wherein FIG. 5(a) is an explanatory diagram showing sample content displayed on the display panel when the multifunction peripheral is in a sleep state, FIG. 5(b) is an explanatory diagram showing a sample screen of a list of contents displayed on the display panel, FIG. 5(c) is an explanatory diagram showing sample content displayed on the display panel when the user has selected one content title from among the titles in the list of FIG. 5(b), and FIG. 5(d) is an explanatory diagram showing sample content displayed on the display panel when the user has touched a View button on the screen of FIG. 5(b);

FIG. 6(a) is a flowchart illustrating steps in a feed analysis process executed by a CPU of the multifunction peripheral;

FIG. 6(b) is a flowchart illustrating steps in a multifunction peripheral display process executed by the CPU of the multifunction peripheral;

FIG. 7 is a sequence chart illustrating the flow of the process performed by the multifunction peripheral and PC to set a reception port;

FIG. 8 is a flowchart illustrating steps in a resident program process executed by a CPU of the PC;

DETAILED DESCRIPTION

Figure 1A:
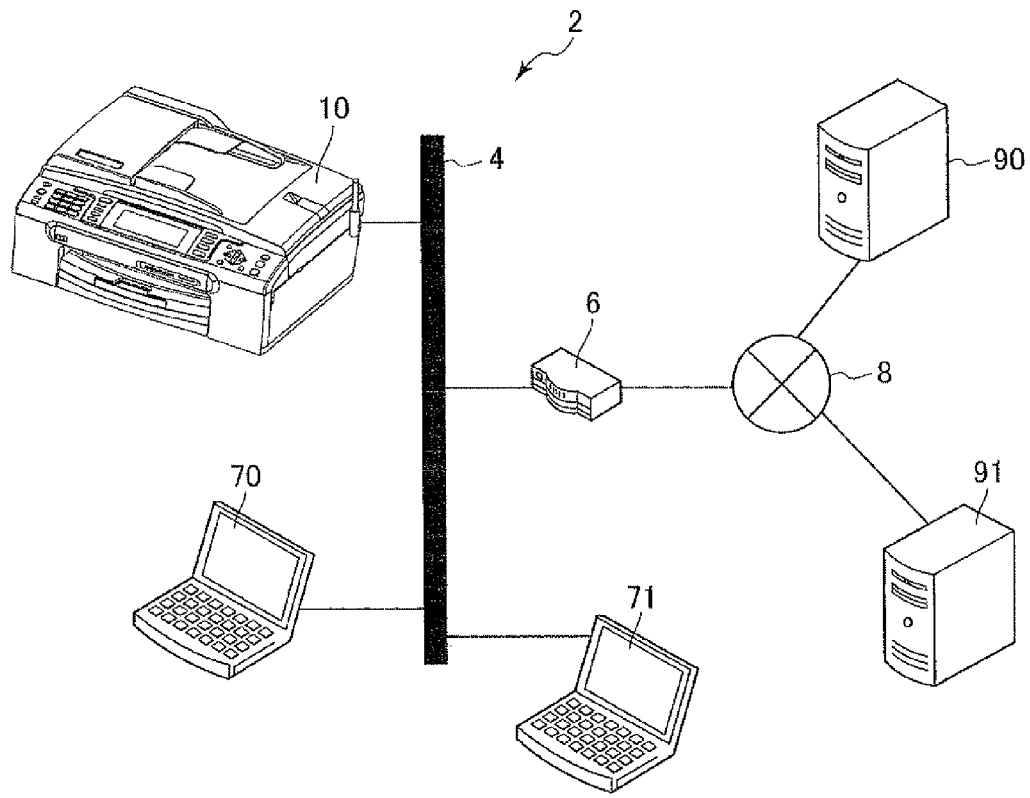
FIG. 1(a) is an explanatory diagram conceptually illustrating a multifunctional system according to an embodiment of the present invention.

Next, an embodiment of the present invention will be described while referring to the accompanying drawings. FIG. 1(a) is an explanatory diagram conceptually illustrating a multifunctional system 2 serving as the embodiment of the communication system according to the present invention.

The multifunctional system 2 includes a multifunction peripheral 10, a plurality of personal computers (PCs) 70 and 71, and a local area network (LAN) 4 connecting the multifunction peripheral 10 and the PCs 70 and 71. While only a single multifunction peripheral 10 and two PCs 70 and 71 are shown in FIG. 1(a), the numbers of these devices may be modified to any desirable numbers.

As shown in FIG. 1(a), the LAN 4 of the multifunctional system 2 is also connected to an internet 8 via a router 6. A plurality of servers 90 and 91 capable of providing content are connected to the internet 8. While only two servers 90 and 91 are shown in FIG. 1(a), this number may also be modified as desired.

In the example of the embodiment, the servers 90 and 91 publish one Web site each, where each Web site includes a plurality of content items. Each of the servers 90 and 91 stores a feed in the RSS format summarizing the plurality of content items included on their respective Web sites. The details of these RSS feeds will be described later in greater detail.

Figure 1B:
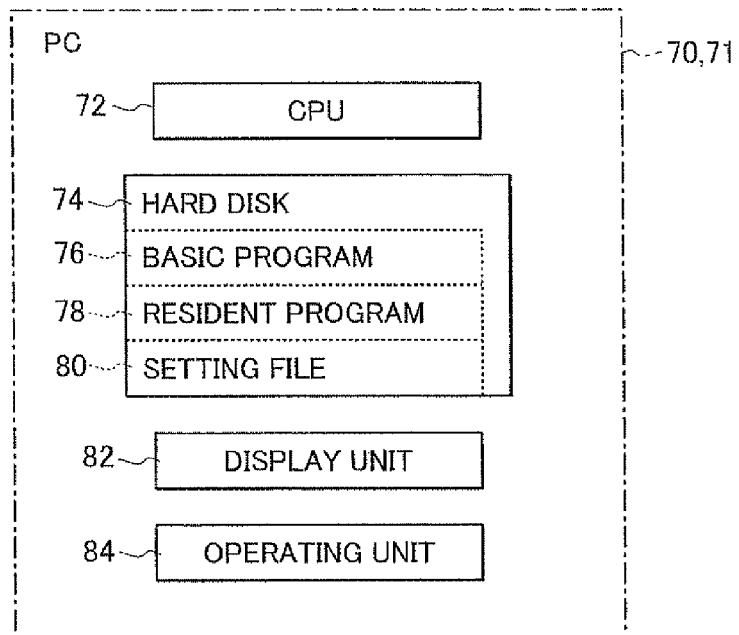
FIG. 1(b) is a block diagram showing the structure of a PC included in the multifunction system of FIG. 1(a)

FIG. 1(b) is a block diagram showing the structure of the PC 70. The PC 71 has the same structure as the PC 70. The PC 70 includes a CPU 72, a hard disk 74, a display unit 82, and an operating unit 84. Although not shown in FIG. 1(b), the PC 70 also includes a network interface that is connected to the LAN 4.

The CPU 72 performs various processes by executing programs stored on the hard disk 74.

The hard disk 74 stores a basic program 76, a resident program 78, and a setting file 80. The basic program 76 functions to control basic operations of the PC 70. For example, the basic program 76 includes a browser for displaying content downloaded from a Web site on the internet 8.

The resident program 78 functions to transmit a PC start notification to the multifunction peripheral 10 and to execute operations based on instructions received from the multifunction peripheral 10. The resident program 78 also executes a process when launched to query the multifunction peripheral 10 for a reception port scheduled for use (hereinafter referred to as the "scheduled reception port") and to verify whether the scheduled reception port received from the multifunction peripheral 10 is available.

The resident program 78 is installed on the PC 70 from computer-readable media, for example. Alternatively, the resident program 78 may be downloaded from a Web site on the internet 8 and installed on the PC 70, for example.

The setting file 80 stored on the hard disk 74 includes the Internet Protocol (IP) address of the multifunction peripheral 10. However, the content of the setting file 80 is not limited to an IP address, but may be a node name, MAC address, device name, or other data capable of identifying the multifunction peripheral 10. The user may set what content is stored in the setting file 80, for example.

The display unit 82 has a relatively large display screen, such as 17 inches or greater, for example, and can display various data. The display unit 82 provided in the PC 70 of the embodiment has a larger display screen than a display panel 50 (see FIG. 2) in the multifunction peripheral 10 described later. The operating unit 84 includes a keyboard and mouse that the user can operate to input various commands and data into the PC 70.

Figure 2:
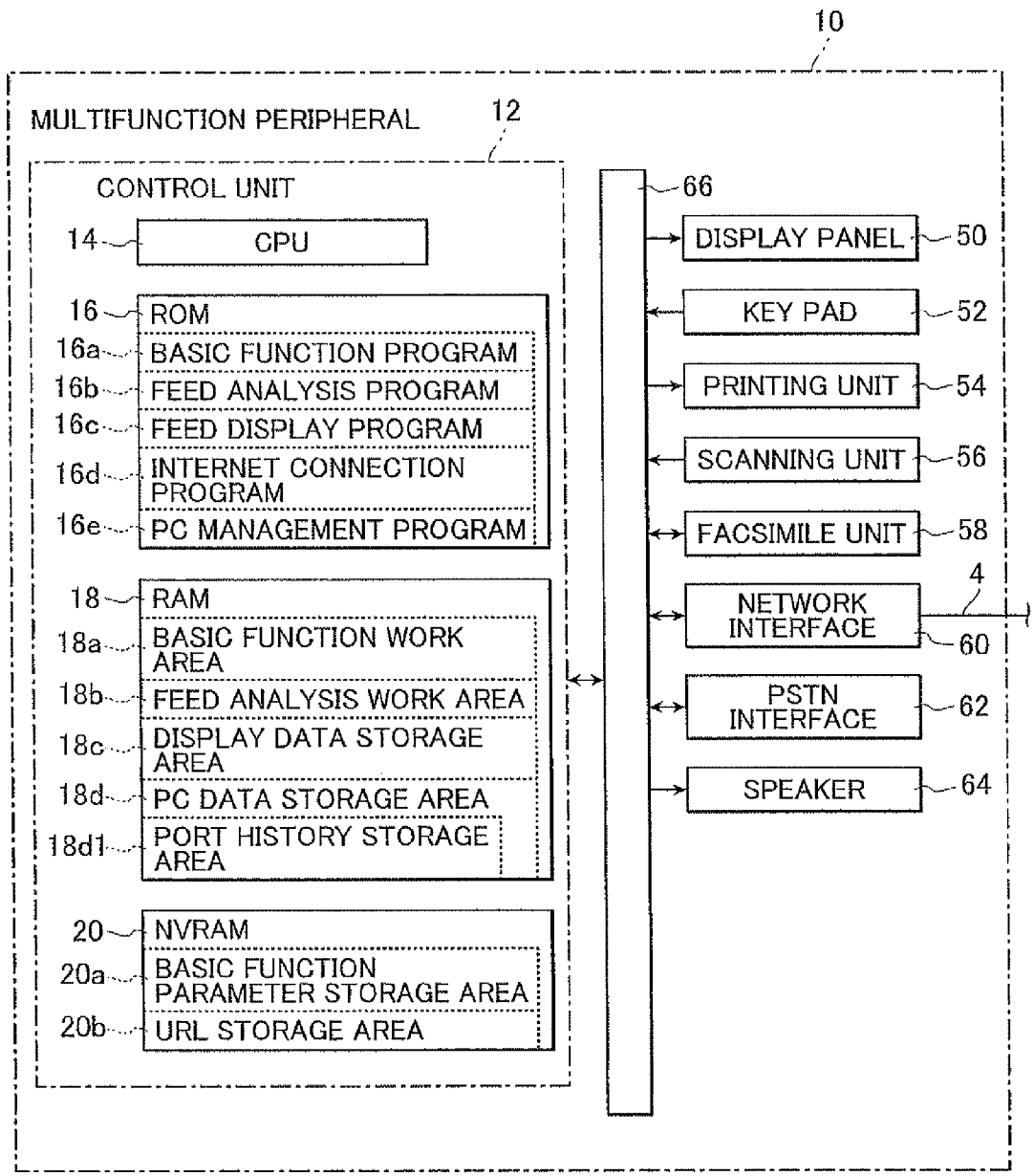
FIG. 2 is a block diagram showing the structure of the multifunction peripheral included in the multifunction system of FIG. 1(a)

FIG. 2 is a block diagram showing the structure of the multifunction peripheral 10. As will be described later in greater detail, the power of the multifunction peripheral 10 according to the embodiment is always on in order that the multifunction peripheral 10 can receive facsimiles. In addition, at prescribed updating intervals, the multifunction peripheral 10 is configured to access pre-registered URLs for content items and to acquire feeds from the servers 90 and 91. The multifunction peripheral 10 displays the acquired feeds on the display panel 50. When the user selects a desired content item based on the feeds displayed on the display panel 50, the selected content item can be displayed on the display unit 82 of a desired PC (the PC 70, for example) in the multifunctional system 2.

As shown in FIG. 2, the multifunction peripheral 10 includes a control unit 12, the display panel 50, a key pad 52, a printing unit 54, a scanning unit 56, a facsimile unit 58, a network interface 60, a PSTN interface 62, and a speaker 64, all of which components are connected to each, other via a bus line 66.

The control unit 12 includes a CPU 14, a ROM 16, a RAM 18, and an NVRAM 20.

The CPU 14 implements various processes by executing programs stored in the ROM 16. Specifically, the ROM 16 stores a basic function program 16a, a feed analysis program 16b, a feed display program 16c, an Internet connection program 16d, and a PC management program 16e.

The basic function program 16a functions to control basic operations of the multifunction peripheral 10. For example, the basic function program 16a may include a program for generating display data to be displayed on the display panel 50, and a program for controlling the printing unit 54, scanning unit 56, facsimile unit 58, and the like.

The internet connection program 16d is executed for connecting the multifunction peripheral 10 to the internet 8. The feed analysis program 16b is executed to analyze feeds acquired from the servers 90 and 91 and to generate data to be displayed on the display panel 50 (hereinafter referred to as "display data"). The feed display program 16c is executed to display this display data on the display panel 50.

The PC management program 16e is executed to implement a process in response to a PC start notification received from the PCs 70 and 71. More specifically, the PC management program 16e functions to store information related to the source PC of the PC start notification (the IP address or hostname of the PC, for example) in a PC data storage area 18d of the RAM 18 described later.

When the multifunction peripheral 10 receives a query from the PC 70 or 71 for the scheduled reception port, the PC management program 16e is executed to extract data from a port history storage area 18d1 in the PC data storage area 18d of the RAM 18 described later for the reception port that has been used most recently with the source PC of the query (a port number) and returns this data to the source PC of the query as the scheduled reception port.

When the multifunction peripheral 10 receives data for an available reception port from the PC 70 or 71, the PC management program 16e is executed to store the data received for the available reception port in the port history storage area 18d1 of the PC data storage area 18d provided in the RAM 18 described later (i.e., to write the received data over the existing data in the PC data storage area 18d).

The RAM 18 includes a basic function work area 18a, a feed analysis work area 18b, a display data storage area 18c, and the PC data storage area 18d.

The basic function work area 18a is used for storing various data generated by the CPU 14 while executing the basic function program 16a.

The feed analysis work area 18b is used for storing various data created by the CPU 14 when executing the feed analysis program 16b. The display data storage area 18c is used for storing display data created by the CPU 14 based on the feed display program 16c.

The PC data storage area 18d is used for storing data related to the PCs 70 and 71 in the multifunctional system 2. The PC data storage area 18d also has the port history storage area 18d1 that is used for storing, for each PC (i.e., for each IP address) in the multifunctional system 2, data on the reception port (port number) that has been used most recently for connecting with the subject PC (PC 70, 71).

The NVRAM 20 includes a basic function parameter storage area 20a, and a URL storage area 20b.

The basic function parameter storage area 20*a* is used for storing various parameters (printing settings and scanning settings, for example) that the CPU 14 uses when executing the basic function program 16*a*.

The URL storage area 20*b* is used for storing the URLs of feeds possessed by the servers 90 and 91. The user must register for each of the servers 90 and 91 in order to receive content therefrom. The user may perform this registration using the multifunction peripheral 10 or the PCs 70 and 71.

If the user uses the PC 70 to register in order to receive content from the server 90, for example, the PC 70 transmits the URL of the feed for the server 90 to the multifunction peripheral 10, whereby the CPU 14 stores this URL in the URL storage area 20*b*.

The display panel 50 is capable of displaying various data. The display screen of the display panel 50 is configured of a liquid crystal display of six inches or less, for example, which is smaller than the display screens possessed by the PCs 70 and 71. The display panel 50 also has a touch panel function. The key pad 52 is configured of a plurality of keys that the user can operate to input various commands and data into the multifunction peripheral 10.

The printing unit 54 has an inkjet or a laser type printing mechanism, for example. The scanning unit 56 has a CCD or a CIS scanning mechanism, for example. The facsimile unit 58 executes various operations required for implementing facsimile communications. The network interface 60 is connected to the LAN 4, enabling the multifunction peripheral 10 to communicate with the PCs 70 and 71 and to access the internet 8.

The PSTN interface 62 is connected to a public switched telephone network (PSTN) not shown in the drawings. The PSTN is used when implementing facsimile communications and telephone communications. The speaker 64 is for outputting sound or verbal messages.

Figure 3:
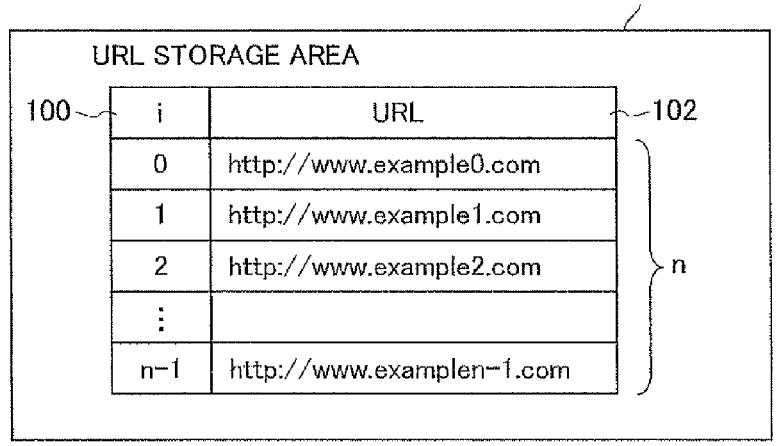
FIG. 3 is an explanatory diagram conceptually illustrating sample content stored in an URL storage area provided in the multifunction peripheral.

Next, content stored in the URL storage area 20*b* of the NVRAM 20 (see FIG. 2) will be described with reference to FIG. 3. FIG. 3 is an explanatory diagram conceptually illustrating sample content stored in the URL storage area 20*b*. The URL storage area 20*b* can store URLs 102 for feed data from each of the servers 90 and 91.

In other words, the URL storage area 20*b* can store a URL 102 for a feed from each Web site. In the example shown in FIG. 3, the URL storage area 20*b* stores n URLs 102. An ID number 100 is assigned to each URL 102. In the embodiment, the symbol i is used to represent the value of the ID number 100.

Figure 4:
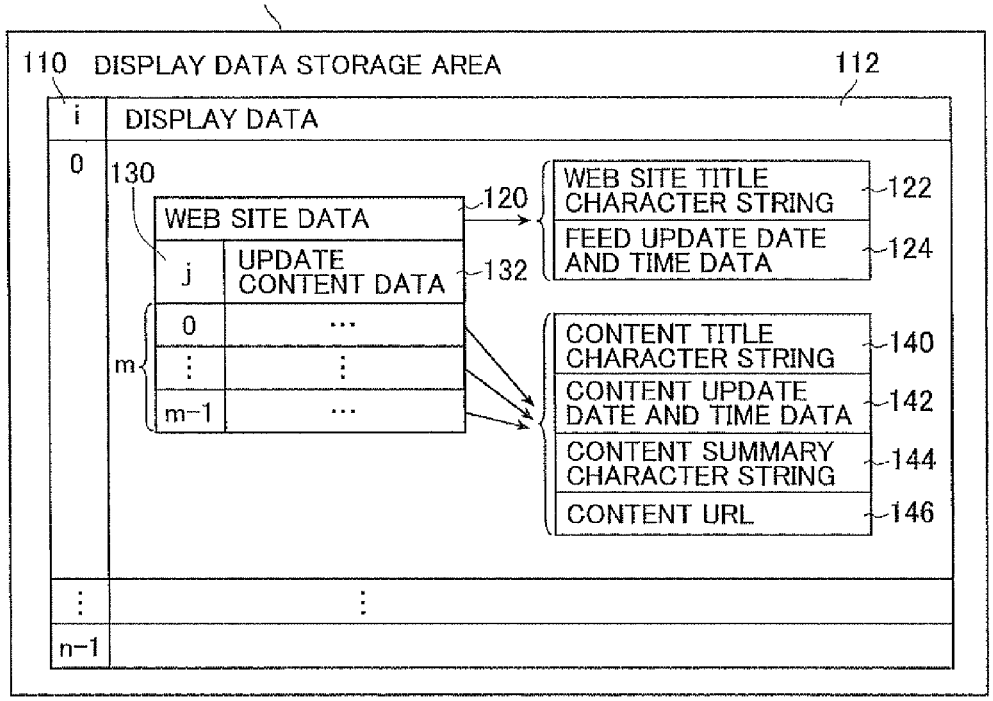
FIG. 4 is an explanatory diagram conceptually illustrating sample content stored in a display data storage area provided in the multifunction peripheral.

Next, the content stored in the display data storage area 18*c* of the RAM 18 (see FIG. 2) will be described with reference to FIG. 4, FIG. 4 is an explanatory diagram conceptually illustrating sample content stored in the display data storage area 18*c*. The display data storage area 18*c* can store display data 112 for each URL stored in the URL storage area 20*b*.

In other words, the display data storage area 18*c* can store display data 112 for each Web site stored in the URL storage area 20*b*. As described above, the URL storage area 20*b* stores n (where n is an integer equal to or greater than 1) URLs 102 (see FIG. 3). Accordingly, the display data storage area 180 stores n entries of display data 112. An ID number 110 is assigned to each entry of display data 112. In the embodiment, the symbol i is used to represent the ID numbers 110, as well as the ID numbers 100 (see FIG. 3).

When looking at the data structure of an individual display data 112 entry, the display data 112 includes Web site data 120. The Web site data 120 further includes a Web site title character string 122, and feed update date and time data 124. The Web site title character string 122 is a character string indicating the title of the Web site, which could also be referred to as the "site name." The feed update date and time data 124 is data related to the date and time that feed data on the servei (content supplying server) was updated (most recent update).

The display data 112 also includes update content data 132. The number of update content data 132 entries is equivalent to the number of content items on the Web site. For example, the display data 112 corresponding to "i=0" in FIG. 4 has m (where m is an integer equal to or greater than 1) update content data 132 entries. This signifies that the Web site corresponding to "i=0" has m content items. For example, if a prescribed Web site has weather-related content and sports-related content, the display data 112 associated with this Web site has two entries of update content data 132. An ID number 130 is assigned to each update content data 132 entry. In the embodiment, the symbol j is used to represent the value of the ID numbers 130.

Each entry of update content data 132 includes a content title character string 140, a content update date and time data 142, a content summary character string 144, and a content URL 146. Using the above example, the update content data 132 corresponding to the weather-related content includes the data 140-146, while the update content data 132 corresponding to the sports-related content also includes the data 140-146.

The content title character string 140 is a character string indicating the title of the content, which may also be referred to as the "content name." The content update date and time data 142 is data related to the date and time at which the content on the server was updated (most recent update). The content summary character string 144 is a summary of text included in the content. More specifically, the content summary character string 144 is a character string longer than the content title and shorter than the entire text in the content that reflects the gist of the content. The content URL 146 is the URL for the content.

Next, the screen displayed on the display panel 50 of the multifunction peripheral 10 when the multifunction peripheral 10 acquires feeds from the servers 90 and 91 will be described with reference to FIGS. 5(*a*)-5(*d*). FIGS. 5(*a*)-5(*d*) include explanatory diagrams showing sample content displayed on the display panel 50.

FIG. 5(*a*) is an explanatory diagram showing sample content displayed on the display panel 50 when the multifunction peripheral 10 is in a sleep state. When the multifunction peripheral 10 is in the sleep state, buttons 160 are displayed on the display panel 50 for selecting one of various functions, such as a facsimile function, scan function, and copy function. The display panel 50 also displays content titles 162 stored in the display data storage area 18*c* as a ticker during the sleep state.

By touching one of the content titles 162, the user can display, on the display panel 50, a site title character string 172 for the Web site, on which a content of the user's selected content title 162 is published, and a list 170 of all content items on the Web site. Here, the list 170 includes the content update date and time data 142 and the content title character string 140 for each content item published on the Web site.

FIG. 5(*b*) is an explanatory diagram showing a sample screen of the list 170 displayed on the display panel 50. In the example shown in FIG. 5(*b*), the content update date and time data "14:32" and the content title character string "Sports . . . " are displayed for the sport-related content, among other data. A button 174 is also displayed on the display panel 50 in the screen including the list 170 for exiting the list display.

If the user touches (selects) one of the content titles in the list 170 displayed on the display panel 50, information related to the touched content title is displayed on the display panel 50.

Figure 5A:
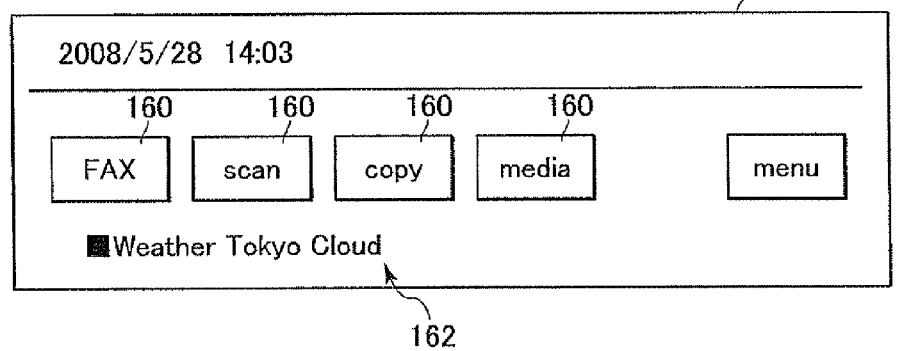
Figure 5B:
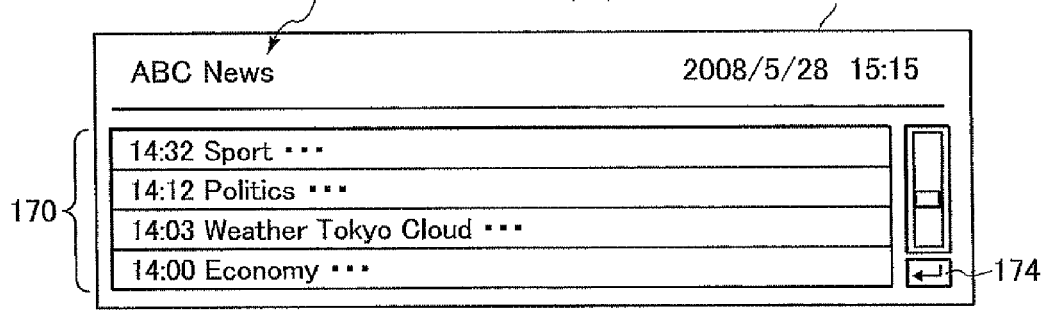
Figure 5C:
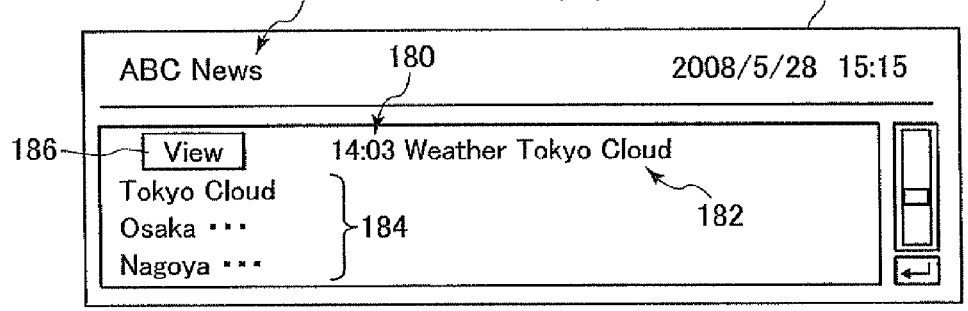

FIG. 5(c) is an explanatory diagram showing sample content displayed on the display panel 50 when the user has selected one content title from among the contents titles in the list 170. In the example shown in FIG. 5(c), the screen displayed on the display panel 50 includes the site title character string 172, a content update date and time data 180, a content title character string 182, a content summary character string 184, and a View button 186.

Figure 5D:
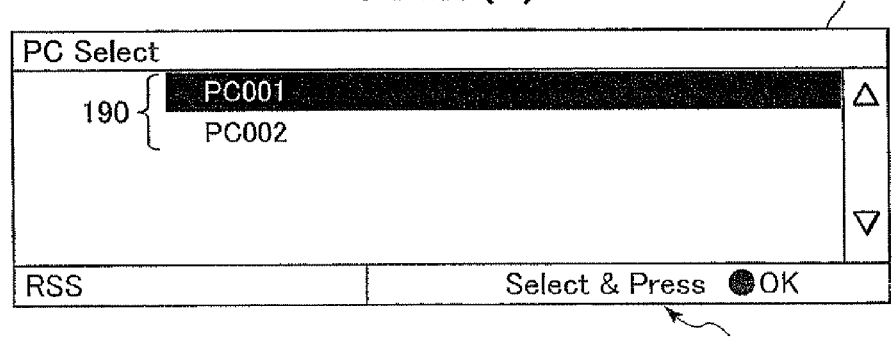

If the user touches the View button 186 in the screen shown in FIG. 5(c), information related to all the PCs stored in the PC data storage area 18d is displayed on the display panel 50. FIG. 5(d) is an explanatory diagram showing sample content that is displayed on the display panel 50 when the user has touched the view button 186 on the screen of FIG. 5(c). In the example of FIG. 5(d), the screen displayed on the display panel 50 includes a list 190 of all PCs stored in the PC data storage area 18d and a Request button 192. By selecting a PC as a destination (the PC 70, for example) from the list 190 and then touching the Request button 192, the user can control the multifunction peripheral 10 to transmit the content URL 146 for content, whose summary is displayed on the screen shown in FIG. 5(c), to the user's selected PC. Upon receiving the content URL 146, the PC accesses the content URL 146 and displays the content at this URL.

Next, processes executed by the multifunction peripheral 10 of the multifunctional system 2 will be described. Although not indicated in the flowcharts, the CPU 14 of the multifunction peripheral 10 executes the following processes based on the PC management program 16e (see FIG. 2). The PCs 70 and 71 in the multifunctional system 2 according to the embodiment are configured to transmit a PC start notification to the multifunction peripheral 10 upon startup (see FIG. 8). The CPU 14 monitors the network connection for a PC start notification and, upon receiving such a PC start notification, stores the IP address or hostname included in the notification in the PC data storage area 18d (see FIG. 2).

The PCs 70 and 71 may also periodically transmit a PC start notification to the multifunction peripheral 10 while running. In such a case, the multifunction peripheral 10 no longer receives a PC start notification from the PCs 70 and 71 when the PCs 70 and 71 stop running (are shut down). In this case, if the CPU 14 has not received a PC start notification from a PC whose IP address or hostname is stored in the PC data storage area 18d over a prescribed continuous interval, the CPU 14 deletes the IP address or hostname from the PC data storage area 18d. In this way, the PC data storage area 18d stores only data related to active PCs.

The PCs 70 and 71 may also be configured not to transmit a PC start notification to the multifunction peripheral 10 periodically. In this case, the PCs 70 and 71 may be configured to transmit a shutdown notification (including the IP address or hostname of the PC) to the multifunction peripheral 10 prior to shutting down. Through this process, the CPU 14 can learn when the PCs 70 and 71 shut down. At this time, the CPU 14 deletes the IP address or hostname included in the shutdown notification from the PC data storage area 18d so that the PC data storage area 18d stores only data related to operating PCs.

Next, processes executed by the CPU 14 of the multifunction peripheral 10 for acquiring and displaying feeds will be described with reference to FIGS. 6(a) and 6(b). FIG. 6(a) is a flowchart illustrating steps in a feed analysis process executed by the CPU 14 of the multifunction peripheral 10. The CPU 14 executes the feed analysis process based on the feed analysis program 16b as an independent task when the multifunction peripheral 10 is first started.

After the feed analysis process is launched and when one of update timings set by the user or determined by the feed analysis program 16b is reached, in S11 the CPU 14 accesses (connects to) URLs, whose data is stored in the URL storage area 20b of the NVRAM 20, and acquires RSS feeds. At this time, the CPU 14 analyzes the acquired feeds, creates the display data 112 (see FIG. 4), and updates the content of the display data storage area 18c by storing the created display data 112 in the display data storage area 18c.

Next, a multifunction peripheral display process executed by the CPU 14 of the multifunction peripheral 10 to display the feeds will be described with reference to FIG. 6(b). FIG. 6(b) is a flowchart illustrating steps in the display process. The CPU 14 executes this display process based on the feed display program 16c (see FIG. 2) as an independent task when the multifunction peripheral 10 is started.

Before describing the multifunction peripheral display process shown in FIG. 6(b), various states of the multifunction peripheral 10 will be described. The multifunction peripheral 10 has a plurality of states, including a sleep state and a function execution state. In the sleep state, the CPU 14 displays data on the display panel 50 for selecting functions. The display panel 50 is lighted at this time.

Specifically, in the sleep state the CPU 14 displays the buttons 160 on the display panel 50 for selecting functions, as illustrated in FIG. 5(a). At this time, the user can input an instruction in the multifunction peripheral 10 for implementing a function by operating a corresponding button 160. When the user touches one of the buttons 160, the multifunction peripheral 10 enters the function execution state. In the function execution state, the CPU 14 displays data on the display panel 50 related to the function being executed (number of copies, for example). After executing the function, the multifunction peripheral 10 again enters the sleep state.

In S31 at the beginning of the multifunction peripheral display process, the CPU 14 displays the content titles 162 stored in the display data storage area 18c of the RAM 18 for each of the URLs (Web sites) stored in the URL storage area 20b of the NVRAM 20 on the screen of the display panel 50 in the sleep state. The content titles 162 are displayed in order of each item of content as a ticker that scrolls continuously from right to left, for example. An example of this screen display is shown in FIG. 5(a). The content titles 162 are not displayed in the function execution state.

If the user touches one of the content titles 162 displayed in the ticker shown in FIG. 5(a), a display request event is generated. At this time, in S32 the CPU 14 acquires site data 120 for the Web site, on which the content having the user's selected content title 162 is published (RSS site), and the update content data 132 stored in association with this Web site from the display data storage area 18c of the RAM 18, creates list data that includes the Web site title character sting 122, all content title character stings 140, and all content update date and time data 142, and displays a Web site title character string 172 and a list 170 corresponding to this list of data on the display panel 50. An example of this screen displayed on the display panel 50 is shown in FIG. 5(b).

The list 170 includes the content update date and time data and a character string of the content title for each of the plurality of content items (m content items, for example).

When the user selects (touches) one of the content titles in the list 170 while the list 170 is displayed on the display panel 50, as shown in FIG. 5(b), an event related to a content selecting operation is generated. At this time, in S33 the CPU 14 creates display data that includes the Web site title character string 122 corresponding to the selected content item, the content title character sting 140 of the content item, the content update date and time data 142 of the content item, and the content summary character string 144 of the content item from the display data storage area 18c of the RAM 18 and displays a screen on the display panel 50 based on this display data. As a result, a screen including the site title character string 172, content update date and time data 180, content title character string 182, content summary character string 184, and View button 186 is displayed on the display panel 50, as shown in FIG. 5(c).

If the user touches the View button 186 while a screen including the View button 186 is displayed in the display panel 50 as shown in FIG. 5(c), in S34 the CPU 14 creates a list of data related to all the PCs stored in the PC data storage area 18d of the RAM 18 and displays this list 190 on the display panel 50 as shown in FIG. 5(d). If the user then touches (selects) one of the PCs in the list displayed on the display panel 50 as a device, on which the user's selected content item is desired to be displayed, and subsequently touches the Request button 192 displayed on the same screen, a PC select operation event is generated. At this time, in S35 the CPU 14 identifies the content URL 146 of the selected content item (see FIG. 4) and transmits the content URL 146 to the destination indicated by the IP address of the selected PC through a reception port (active port) for the selected PC, which is currently set in the port history storage area 18d1 in correspondence with the selected PC as will be described later.

After the CPU 14 transmits the content URL 146 to the selected PC, the selected PC (such as the PC 70) receives the content URL 146 and accesses and displays the content at the content URL 146.

As will be described later in greater detail, each PC 70, 71 is configured so that when the power to the PC is turned on, the PC enters a standby state for a prescribed reception port (a reception port conforming to the TCP/IP protocol in the embodiment) through control by the resident program 78 in order to be able to receive the content URL 146 transmitted from the multifunction peripheral 10.

Next, steps in the process performed by the multifunction peripheral 10 and the PC 70 (or PC 71) in the multifunctional system 2 of the embodiment for setting the reception port at which the PC waits for the content URL 146 will be described with reference to FIG. 7. FIG. 7 is a sequence chart illustrating the flow of the process performed by the multifunction peripheral 10 and PC 70 to set the reception port. The same process is performed between the multifunction peripheral 10 and the PC 71.

As shown in FIG. 7, when the resident program 78 on the PC 70 is started (P1), the PC 70 queries the multifunction peripheral 10 for the scheduled reception port (P2). Upon receiving this query, the multifunction peripheral 10 retrieves the scheduled reception port (P3). The multifunction peripheral 10 subsequently notifies the PC 70 of the port number specifying the scheduled reception port (i.e., notifies the PC 70 of the scheduled reception port). While this process will be described later in greater detail, in the embodiment the multifunction peripheral 10 retrieves the port number of the reception port that has been most recently used with the PC 70 from which the query was received.

After receiving the notification, the PC 70 confirms whether the scheduled reception port (port number) indicated in the notification is available (P4). If the scheduled reception port indicated in the notification is not available, the PC 70 retrieves another port number for an available reception port.

In this case, the PC 70 notifies the multifunction peripheral 10 of the port number for the available reception port (notifies the multifunction peripheral 10 of the available reception port). Upon receiving this notification, the multifunction peripheral 10 sets the port number of the reception port included in the notification (the reception port that the PC 70 confirmed to be available) as the reception port to be used as the destination of the content URL 146 (P5).

The multifunction peripheral 10 then notifies the PC 70 of the port number of the reception port that the multifunction peripheral 10 will use as the destination of the content URL 146 (notifies the PC 70 of the reception port that will be used). After receiving this notification from the multifunction peripheral 10, the PC 70 sets the reception port at which the content URL 146 will be received from the multifunction peripheral 10 to the reception port (port number) in the notification and waits for reception (P6).

Next, a process executed by the CPU 72 of the PC 70 or 71 based on the resident program 78 (see FIG. 1(b)) will be described with reference to FIG. 8. FIG. 8 is a flowchart illustrating steps in the process executed by the CPU 72 of the PC 70 based on the resident program 78. The same process is also executed on the PC 71.

The CPU 72 begins the process shown in FIG. 8 when the resident program 78 is started. The resident program 78 is automatically launched after the power to the PC 70 is turned on and the OS is started. In S111 at the beginning of the resident program process, the CPU 72 reads the content stored in the setting file 80 (see FIG. 1(b)).

In S112 the CPU 72 determines whether a setting has been made to receive the content URL 146 from the multifunction peripheral 10 by determining whether data identifying the multifunction peripheral 10 is stored in the setting file 80. Since an IP address is used to identify the multifunction peripheral 10 in the embodiment, the CPU 72 determines whether an IP address is stored in the setting file 80.

If the CPU 72 determines in S112 that data identifying the multifunction peripheral 10 is stored in the setting file 80, that is, that a reception setting has been made (S112: YES), the CPU 72 advances to S113. However, if data identifying the multifunction peripheral 10 is not stored in the setting file 80 (S112: NO), the CPU 72 ends the current process executed based on the resident program 78.

In S113 the CPU 72 transmits a PC start notification to the multifunction peripheral 10. The PC start notification includes the IP address or hostname of the PC 70, and is for notifying the multifunction peripheral 10 that the PC 10 has started the resident program for receiving content URLs 146. Subsequently, the CPU 72 executes a reception port verification process in S114 to verify what reception port is to be used for receiving the content URL 146 and its port number. The details of the reception port verification process in S114 will be described later in greater detail with reference to FIG. 9.

After completing the reception port verification process of S114, in S115 the CPU 72 waits until an event of any type is generated. The CPU 72 advances to S116 when an event occurs. In S116 the CPU 72 determines whether a content URL 146 has been received from the multifunction peripheral 10. As described earlier with reference to FIG. 6(b), the multifunction peripheral 10 transmits the content URL 146 to the PC 70 in S35 of the display process.

If the CPU 72 determines in S116 that a content URL 146 has been received (S116: YES), in S119 the CPU 72 launches a default browser program and in S120 accesses the content URL 146 received from the multifunction peripheral 10 and displays the content at the content URL 146 on the display unit 82.

It is noted that in S119, the CPU 72 may allow a user to select his/her desired browser program and to launch the user's selected browser program, rather than launching the default browser program.

In this way, the user of the PC 70 can view content at the content URL 146 displayed on the display unit 82. While it is difficult to display all of the content on the relatively small display panel 50 provided in the multifunction peripheral 10, the multifunctional system 2 according to the embodiment allows the user to select a content item on the multifunction peripheral 10 and view this content on the relatively large display unit 82 with which the content can be viewed more easily and conveniently.

However, if the CPU 72 determines that the content URL 146 has not been received (S116: NO), in S117 the CPU 72 determines whether the user has inputted an instruction to halt the resident program 78. The user can input an instruction in the PC 70 to halt the resident program 78 by performing a prescribed operation on the operating unit 84, for example.

If the CPU 72 determines that an instruction to halt the resident program 78 has been inputted (S117: YES), the CPU 72 halts the resident program process. However, if an instruction to halt the resident program 78 has not been inputted (S117: NO), in S118 the CPU 72 executes a process corresponding to the event and subsequently returns to S115 to wait for the next generated event.

Figure 9:
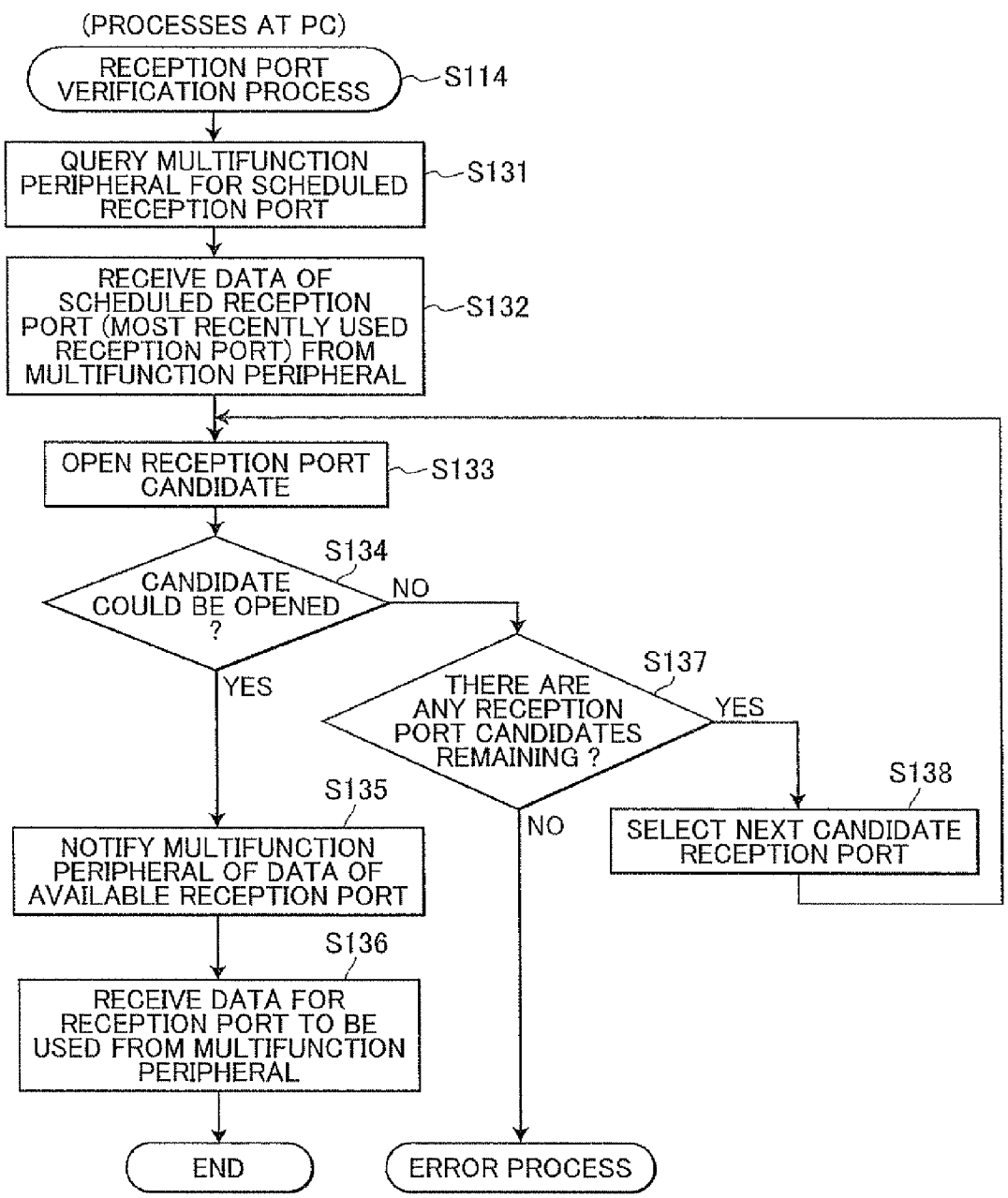
FIG. 9 is a flowchart illustrating steps in a reception port verification process performed during the resident program process of FIG. 8.

Next, the reception port verification process of S114 mentioned above will be described with reference to FIG. 9. FIG. 9 is a flowchart illustrating steps in the reception port verification process performed during the resident program process of FIG. 8.

In S131 at the beginning of the reception port verification process, the CPU 72 queries the multifunction peripheral 10 for the scheduled reception port. The CPU 72 also transmits the IP address of the PC 70 together with the query.

Figure 10A:
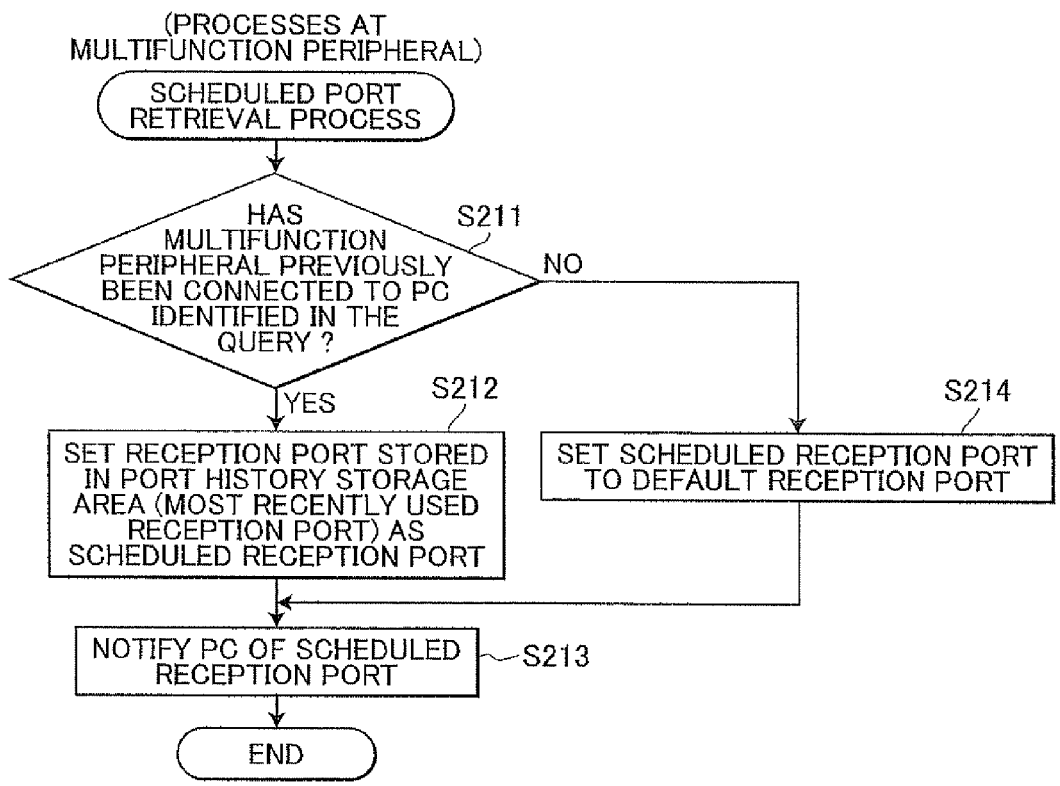
FIG. 10(a) is a flowchart illustrating steps in a scheduled port retrieval process executed by the CPU of the multifunction peripheral.

As a result of this query, the multifunction peripheral 10 returns the port number of the reception port that has been used most recently as the scheduled reception port (see FIG. 10(a)). Accordingly, in S132 the CPU 72 receives data indicating the scheduled reception port (port number) from the multifunction peripheral 10.

In S133 the CPU 72 sets the scheduled reception port received from the multifunction peripheral 10 as a reception port candidate and attempts to open the reception port candidate. In S134 the CPU 72 determines whether the candidate could be opened.

If the reception port candidate was opened (S134: YES), indicating that this reception port is not being used by another application and is therefore available, in S135 the CPU 72 notifies the multifunction peripheral 10 of the port number for the reception port opened in S133 as data for an available reception port.

Consequently, the multifunction peripheral 10 sets the port number for the available reception port in the notification as the reception port that is to be used as a destination for the content URL 146 in the current connection. Subsequently, the multifunction peripheral 10 notifies the PC 70 of the port number for the reception port to be used (see FIG. 10(b)).

In S136 the CPU 72 receives data for the reception port to be used from the multifunction peripheral 10 and subsequently ends the reception port verification process of S114. Next, the CPU 72 advances to S115 of FIG. 8, sets the port number in the notification received from the multifunction peripheral 10 as the reception port for the content URL 146 to be transmitted from the multifunction peripheral 10, and waits to receive the content URL 146.

The CPU 72 advances from S114 to S115 while the reception port, opened in S133 to verify that the reception port is available, remains in an open state. Accordingly, the CPU 72 can prevent another application from subsequently using the reception port after the CPU 72 has confirmed that the reception port is available, thereby avoiding a conflict in which the reception port becomes unavailable.

However, if the CPU 72 determines in S134 that the reception port could not be opened (S134: NO), indicating that the reception port candidate is currently being used by another application or is otherwise unavailable, the CPU 72 advances to S137.

in S137 the CPU 72 determines whether there are any reception port candidates remaining. For the sake of simplicity, the description of the embodiment assumes that the multifunction peripheral 10 can access all reception ports in the PC 70. However, the PC 70 may store a list of reception ports that the multifunction peripheral 10 can use (a reception port candidate table) on the hard disk 74 in advance and may determine in S137 whether any of the reception port candidates in the list remain.

If the CPU 72 determines that reception port candidates remain (S137: YES), in S138 the CPU 72 selects the next candidate (port number) and returns to S133 to determine whether the next reception port candidate is available.

Hence, if the scheduled reception port included in the notification received from the multifunction peripheral 10 is not available for receiving the content URL 146 from the multifunction peripheral 10, the CPU 72 searches sequentially through reception ports in the PC 70 that can be used for communication with the multifunction peripheral 10 in order to find an available reception port. This method improves the possibility of connecting with the multifunction peripheral 10.

However, if the CPU 72 determines in S137 that no more reception port candidates remain (S137: NO), indicating that there are currently no available reception ports for receiving the content URL 146 from the multifunction peripheral 10, the CPU 72 performs an error process (displays a message on the display unit 82 or the like) and subsequently ends the process based on the resident program 78.

Next, a process executed by the multifunction peripheral 10 when the multifunction peripheral 10 receives a query from the PC 70 or 71 for the scheduled reception port will be described with reference to FIG. 10(a). FIG. 10(a) is a flowchart illustrating steps in a scheduled port retrieval process executed by the CPU 14 of the multifunction peripheral 10.

The CPU 14 of the multifunction peripheral 10 begins the scheduled port retrieval process upon receiving a query for a scheduled reception port from the PC 70 or 71. In S211 at the beginning of this process, the CPU 14 determines whether the multifunction peripheral 10 has previously been connected to the PC identified in the query. More specifically, the CPU 14 determines whether the IP address included in the query received from the PC 70 or 71 is stored in the port history storage area 18d1.

If the CPU 14 determines in S211 that the multifunction peripheral 10 has previously been connected to the PC (S211: YES), in S212 the CPU 14 sets the reception port stored in the port history storage area 18d1 in association with the PC making the query (i.e., the most-recently used reception port) as the scheduled reception port and advances to S213.

However, if the CPU 14 determines that the multifunction peripheral 10 has not been previously connected to the PC (S211: NO), in S214 the CPU 14 sets the scheduled reception port to a reception port prepared as a default, and subsequently advances to S213.

In S213 the CPU 14 returns, to the PC from which the query has been received, data indicating the scheduled reception port set in S212 or S213, after which the CPU 14 ends the scheduled port retrieval process.

Through this scheduled port retrieval process, the multifunction peripheral 10 according to the embodiment sets the scheduled reception port to the port that has been most recently used with the PC when connection history exists for that PC. By using a reception port that has been effective in the past, there is less likelihood that the reception port will be blocked by a firewall or the like or will be in use by another application.

Therefore, it is highly probable that the PC will find the reception port presented by the multifunction peripheral 10 as the scheduled reception port to be available during the reception port verification process described above with reference to FIG. 9. Accordingly, a connection between the multifunction peripheral 10 and the PC (the PC 70 or 71) can be established quickly.

Figure 10B:
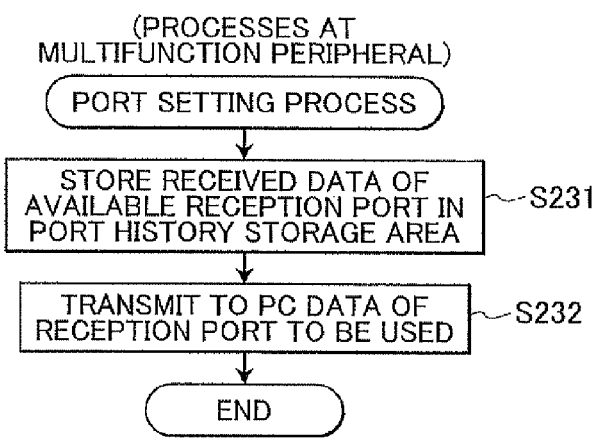
FIG. 10(b) is a flowchart illustrating steps in a port setting process executed by the CPU of the multifunction peripheral.

Next, the process executed by the multifunction peripheral 10 upon receiving data indicating an available reception port (port number) from the PC 70 or 71 will be described with reference to FIG. 10(b). FIG. 10(b) is a flowchart illustrating steps in a port setting process executed by the CPU 14 of the multifunction peripheral 10.

The CPU 14 executes the port setting process when the multifunction peripheral 10 receives data from the PC 70 or 71 indicating an available reception port. In S231 at the beginning of the port setting process in FIG. 10(b), the CPU 14 stores the data received from the PC in the port history storage area 18d1 in correspondence with the source PC of the available reception port data (overwrites the port history storage area 18d1 with the received data), thereby setting the reception port (active port) that will be used for the source PC of the available reception port data as the destination of the content URL 146 in the current connection.

In S232 the CPU 14 transmits, to the PC that has been the source of the available reception port data (the PC 70 or 71), the data (port number) of the reception port set in S231 as the reception port to be used, and subsequently ends the port setting process. By completing the process in S232, the CPU 14 establishes a connection between the multifunction peripheral 10 and the PC to which the multifunction peripheral 10 has transmitted the reception port data to be used. Upon receiving data of the reception port to be used, the PC waits to receive the content URL 146 from the multifunction peripheral 10.

As described above, when the resident program 78 on the PC 70 or 71 is launched in the multifunctional system 2 according to the embodiment, the CPU 72 queries the multifunction peripheral 10 for the scheduled reception port and determines whether the scheduled reception port is available. If available, the CPU 72 establishes a connection with the multifunction peripheral 10 using this reception port to wait for the content URL 146. Accordingly, a connection can be reliably established between the PC 70 or 71 and the multifunction peripheral 10.

Further, since the multifunction peripheral 10 manages the reception ports for connecting with PCs in the multifunctional system 2, there is no need to perform arbitration for ports used among the plurality of applications on these PCs. Thus, this method simplifies port management and reduces management costs.

While the invention has been described in detail with reference to the specific embodiment thereof, it would be apparent to those skilled in the art that many modifications and variations may be made therein without departing from the spirit of the invention, the scope of which is defined by the attached claims.

For example, in the embodiment described above, the multifunction peripheral 10 stores the reception port used most recently by each PC (PC 70 or 71) in the port history storage area 18d1 and returns this reception port to the corresponding PC as the scheduled reception port upon receiving a query from the PC for the scheduled reception port.

However, the history stored in the port history storage area 18d1 may include not just the most recently used port, but a plurality of previously used ports. In this case, upon receiving a query for the scheduled reception port from a PC, the multifunction peripheral 10 can transmit some or all of the reception ports stored in the port history storage area 18d1 corresponding to this PC as the scheduled reception ports.

Further, in S131-S132 of the reception port verification process described in FIG. 9 of the embodiment, the PC 70 or 71 receives data for the scheduled reception port from the multifunction peripheral 10 after querying the multifunction peripheral 10 for the scheduled reception port. However, the PC may be configured to receive data indicating the scheduled reception port from the multifunction peripheral 10 after transmitting the PC start notification to the multifunction peripheral 10 in S113 of the resident program process shown in FIG. 8.

When using this method, it is possible to eliminate S131 of the reception port verification process. Further, upon receiving the PC start notification, the multifunction peripheral 10 transmits data for the scheduled reception port to the PC. Thus, the PC start notification serves as a query querying the multifunction peripheral 10 for the scheduled reception port.

In the embodiment described above, the port history storage area 18d1 is a region in the RAM 18, but the port history storage area 18d1 may be a region in the NVRAM 20 instead.

In the embodiment described above, communication between the multifunction peripheral 10 and the PCs 70 and 71 is performed based on the TCP/IP protocol, but a different communication protocol may be used as appropriate. In such a case, steps in the reception port verification process of FIG. 9, the scheduled port retrieval process of FIG. 10(a), and the port setting process of FIG. 10(b) are executed on those reception ports that are conforming to the relevant communication protocol.

In the embodiment described above, each of the servers 90 and 91 stores both content items and a feed. However, the multifunctional system 2 may have at least one content server that stores contents and at least one feed server that stores feeds for the contents stored in the content server separately from the content server.

Further, a browser program may be installed on the multifunction peripheral 10, although one was not installed on the multifunction peripheral 10 in the embodiment described above. When the multifunction peripheral 10 has a browser program, the multifunction peripheral 10 can download content and display the content in the display panel 50. For example, the multifunction peripheral 10 may display data related to the multifunction peripheral 10 on the display panel 50 in the PC list of FIG. 5(d) and may download content and display the content on the display panel 50 when the user selects the multifunction peripheral 10 from the PC list.

The term "content" in the embodiment may be rephrased to mean a single item among a plurality of items on a Web site. Here, each of the plurality of items corresponds to a single URL. Hence, the term "content" may be rephrased to mean data corresponding to a single URL on the Web site.

Further, a feed (content summary) may include Web site data, and the Web site data may include the title of the Web site. The feed may include, for each of the plurality of content items, a character string of the content title and the URL. The content summary may include data indicating the date and time that content has been updated for each of the plurality of content items. The content summary may also include a character string that summarizes the text for each of the plurality of content items. The character string for the summary may be longer than the title of the content, but shorter than the entire text in the content.

What is claimed is:

1. A communication system comprising:
   a communication device; and
   a data receiver that is configured so as to be capable of being connected to the communication device,
   the communication device comprising:
   a content summary receiving unit that is configured so as to be capable of receiving content summary data transmitted from an external device, the content summary data including at least positional data and title data for content data; and
   a positional data transmitting unit that is configured so as to be capable of outputting the positional data for the content data according to a prescribed communication protocol,
   the data receiver comprising:
   a scheduled port querying unit configured to query the communication device for a scheduled port conforming to the communication protocol, the communication device scheduled to output the positional data for the content data, the output transmitted through the scheduled port to the data receiver,
   the communication device further comprising:
   a scheduled port notifying unit that, upon receiving the scheduled port query from the data receiver, transmits to the data receiver a scheduled port notification indicating the scheduled port,
   the data receiver further comprising:
   a determining unit that, upon receiving the scheduled port notification from the communication device, determines whether the scheduled port indicated in the scheduled port notification is available; and
   an availability notifying unit that, when the determining unit has determined that the scheduled port is available, transmits to the communication device an availability notification indicating the scheduled port that is determined as being available,
   the communication device further comprising:
   an active port setting unit that, upon receiving the availability notification from the data receiver, sets the scheduled port indicated by the availability notification as an active port; and
   an active port notifying unit that transmits to the data receiver an active port notification indicating the active port, the positional data transmitting unit transmitting the positional data for the content data to the data receiver through the active port at a prescribed timing and according to the prescribed communication protocol,
   the data receiver further comprising:
   an active port receiving unit that receives the active port notification from the communication device; and
   a positional data receiving unit that is configured so as to be capable of receiving, via the active port indicated in the active port notification, the positional data for the content data outputted from the communication device.

2. A communication system according to claim 1, wherein the scheduled port querying unit of the data receiver transmits to the communication device the query in the form of a start notification notifying that the data receiver has started a program for receiving the positional data for the content data from the communication device.

3. A communication system according to claim 1, wherein the scheduled port querying unit of the data receiver transmits, to the communication device, the query querying the communication device for a port number of the scheduled port,
   wherein upon receiving the scheduled port query from the data receiver, the scheduled port notifying unit of the communication device transmits to the data receiver the scheduled port notification indicating the port number of the scheduled port,
   wherein upon receiving the scheduled port notification from the communication device, the determining unit of the data receiver determines whether the scheduled port having the port number indicated in the scheduled port notification is available, and
   wherein the availability notifying unit transmits, to the communication device, the availability notification indicating the port number of the scheduled port that is determined as being available,
   wherein the active port setting unit sets the scheduled port having the port number indicated by the availability notification as the active port.

4. A communication system according to claim 1, wherein the communication device further includes a communication-side display unit that displays the content summary data received by the content summary receiving unit, and
   wherein the data receiver further includes:
   a content receiving unit that is configured so a to be capable of receiving the content data from an external device indicated by the positional data of the content data; and
   a receiver-side display unit that displays the content data received by the content receiving unit.

5. A communication system according to claim 1,
   wherein the communication device comprise an input unit that is configured to enable a user to designate his/her desired data receiver, to which the positional data for the content data is desired to be transmitted, and to input his/her instruction to transmit the positional data for the content data,
   wherein in response to the user's input of his/her instruction to the input unit, the positional data transmitting unit transmits the positional data for the content data to the user's selected data receiver through the active port, which has been set by the active port setting unit for the user's selected data receiver.

6. A communication system according to claim 1,
   wherein the determining unit of the data receiver determines whether another port conforming to the communication protocol is available after determining that the scheduled port indicated in the scheduled port notification is unavailable;
   wherein the data receiver further comprises another availability notifying unit that, when the determining unit determines that the another port is available, transmits to the communication device another availability notification indicating the another port that is determined as being available; and
   wherein upon receiving the another availability notification from the data receiver, the active port setting unit sets the another port as the active port.

7. A communication system according to claim 1, wherein the determining unit of the data receiver executes an operation to open the scheduled port, and wherein when the scheduled port is opened, the determining unit determines that the scheduled port is available and maintains the open state of the scheduled port to enable the scheduled port to receive the position data of the content data.

8. A communication system according to claim 6, wherein the determining unit of the data receiver executes an operation to open the another port, and wherein when the another port is opened, the determining unit determines that the another port is available and maintains the open state of the another port to enable the another port to receive the position data of the content data.

9. A communication system according to claim 1, wherein the communication device further comprises a port history storage unit that stores an active port that has been set by the active port setting unit most recently with respect to the data receiver; and
the scheduled port notifying unit of the communication device sets, as a single scheduled port, the active port stored in the port history storing unit with respect to the data receiver, and indicates the single scheduled port in the scheduled port notification.

10. A communication system according to claim 1, wherein the communication device further comprises a port history storage unit that stores at least one active port, each of which has been set by the active port setting unit with respect to the data receiver; and
the schedule notifying unit of the communication device sets, as at least one scheduled port, at least a part of the at least one active port that is stored in the port history storing unit with respect to the data receiver, and indicates the at least one scheduled port in the scheduled port notification.

11. A method for receiving positional data for content data from a communication device, the communication device including: a content summary receiving unit that is configured so as to be capable of receiving content summary data transmitted from an external device, the content summary data including the positional data for the content data and title data for the content data; and a positional data transmitting unit that is configured so as to be capable of outputting the positional data for the content data according to a prescribed communication protocol,
the method comprising:
querying the communication device for a scheduled port conforming to the communication protocol, the communication device scheduled to output the positional data for the content data, the output transmitted through the scheduled port to the data receiver, thereby urging the communication device to output a scheduled port notification indicating the scheduled port;
upon receipt of the scheduled port notification, determining whether the scheduled port indicated in the scheduled port notification is available;
when it is determined that the scheduled port is available, transmitting to the communication device an availability notification indicating the scheduled port that is determined as being available, thereby urging the communication device to set, as an active port, the scheduled port determined as being available;
receiving an active port notification when the active port notification is transmitted from the communication device; and
receiving the positional data for the content data through the active port indicated in the active port notification when the positional data for the content data is transmitted from the positional data transmitting unit of the communication device and according to the prescribed communication protocol.

12. A method according to claim 11, further comprising:
determining whether another port conforming to the communication protocol is available when the scheduled port indicated in the scheduled port notification is determined as being unavailable; and
when the another port is determined as being available, transmitting to the communication device another availability notification indicating the another port that is determined as being available, thereby urging the communication device to set, as the active port, the another port determined as being available.

13. A method according to claim 11, wherein the determining whether the scheduled port is available includes:
executing an operation to open the scheduled port; and
when the scheduled port is opened, determining that the scheduled port is available and maintaining the open state of the scheduled port to enable the scheduled port to receive the position data of the content data.

14. A method according to claim 12, wherein the determining whether the another port is available includes:
executing an operation to open the another port; and
when the another port is opened, determining that the another port is available and maintaining the open state of the another port to enable the another port to receive the position data of the content data.

15. A computer readable storage medium storing a set of program instructions for controlling a data processing device to serve as a data receiver for receiving positional data for content data from a communication device, the communication device including: a content summary receiving unit that is configured so as to be capable of receiving content summary data transmitted from an external device, the content summary data including the positional data for the content data and title data for the content data; and a positional data transmitting unit that is configured so as to be capable of outputting the positional data for the content data according to a prescribed communication protocol,
the instructions comprising:
querying the communication device for a scheduled port conforming to the communication protocol, the communication device scheduled to output the positional data for the content data, the output transmitted through the scheduled port to the data receiver, thereby urging the communication device to output a scheduled port notification indicating the scheduled port;
upon receipt of the scheduled port notification, determining whether the scheduled port indicated in the scheduled port notification is available;
when it is determined that the scheduled port is available, transmitting to the communication device an availability notification indicating the scheduled port that is determined as being available, thereby urging the communication device to set, as an active port, the scheduled port determined as being available;
receiving an active port notification when the active port notification is transmitted from the communication device; and
receiving the positional data for the content data through the active port indicated in the active port notification when the positional data for the content data is transmitted from the positional data transmitting unit of the communication device and according to the prescribed communication protocol.

16. The computer readable storage medium according to claim 15, wherein the instructions further comprises:
   determining whether another port conforming to the communication protocol is available when the scheduled port indicated in the scheduled port notification is determined as being unavailable; and
   when the another port is determined as being available, transmitting to the communication device another availability notification indicating the another port that is determined as being available, thereby urging the communication device to set, as the active port, the another port determined as being available.

17. The computer readable storage medium according to claim 16, wherein the determining whether the another port is available includes:
   executing an operation to open the another port; and
   when the another port is opened, determining that the another port is available and maintaining the open state of the another port to enable the another port to receive the position data of the content data.

18. The computer readable storage medium according to claim 15, wherein the determining whether the scheduled port is available includes:
   executing an operation to open the scheduled port; and
   when the scheduled port is opened, determining that the scheduled port is available and maintaining the open state of the scheduled port to enable the scheduled port to receive the position data of the content data.

* * * * *